United States Patent [19]

Dokuzovic et al.

[11] Patent Number: 4,842,870

[45] Date of Patent: Jun. 27, 1989

[54] ANHYDROUS, NON-STALING CHEWING GUM COMPOSITION

[75] Inventors: Zdravko Dokuzovic, Mississauga; Zoltan Bodor, Pickering; Ramola Lewis, Toronto; Costantina Kostantelou, Markham, all of Canada

[73] Assignee: Warner-Lambert Company, Morris Plains, N.J.

[21] Appl. No.: 136,314

[22] Filed: Dec. 22, 1987

[51] Int. Cl.$^4$ .............................................. A23G 3/30
[52] U.S. Cl. ...................................... 426/3; 426/548; 426/804; 426/5
[58] Field of Search ......................................... 426/3-6, 426/548, 804

[56] References Cited

U.S. PATENT DOCUMENTS

| | | | |
|---|---|---|---|
| 3,262,784 | 7/1966 | Bucher | 99/135 |
| 3,285,750 | 11/1966 | Ishida | 426/4 |
| 3,995,064 | 11/1976 | Ehrgott | 426/3 |
| 4,035,572 | 7/1977 | Stubits et al. | 536/108 |
| 4,150,161 | 4/1979 | Rudolph et al. | 426/3 |
| 4,329,369 | 5/1982 | Tezuka et al. | 426/3 |
| 4,352,822 | 10/1982 | Cherukuri et al. | 426/4 |
| 4,382,963 | 5/1983 | Klose et al. | 426/3 |
| 4,459,311 | 7/1984 | DeTora et al. | 426/3 |
| 4,514,422 | 4/1985 | Yang et al. | 426/3 |
| 4,518,615 | 5/1985 | Cherukuri et al. | 426/6 |
| 4,525,363 | 6/1985 | D'Amelia | 426/6 |

*Primary Examiner*—Jeanette Hunter
*Attorney, Agent, or Firm*—Gary M. Nath

[57] ABSTRACT

Substantially anhydrous, non-staling chewing gum composition containing a homogenous premixture of a chewing gum base and a polyisobutylene having an average molecular weight of about 20,000 to about 100,000 in combination with a sweetening agent.

11 Claims, 10 Drawing Sheets

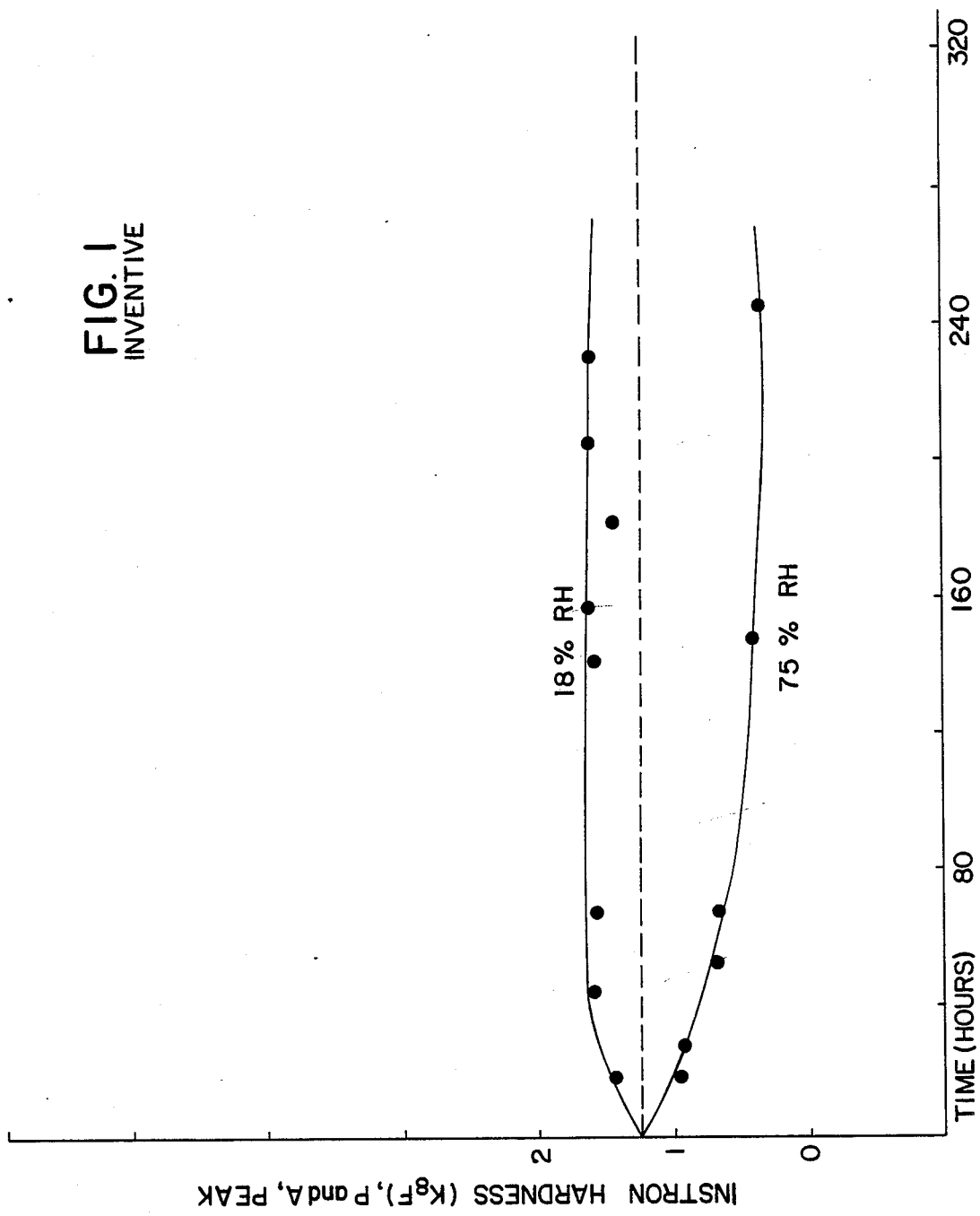

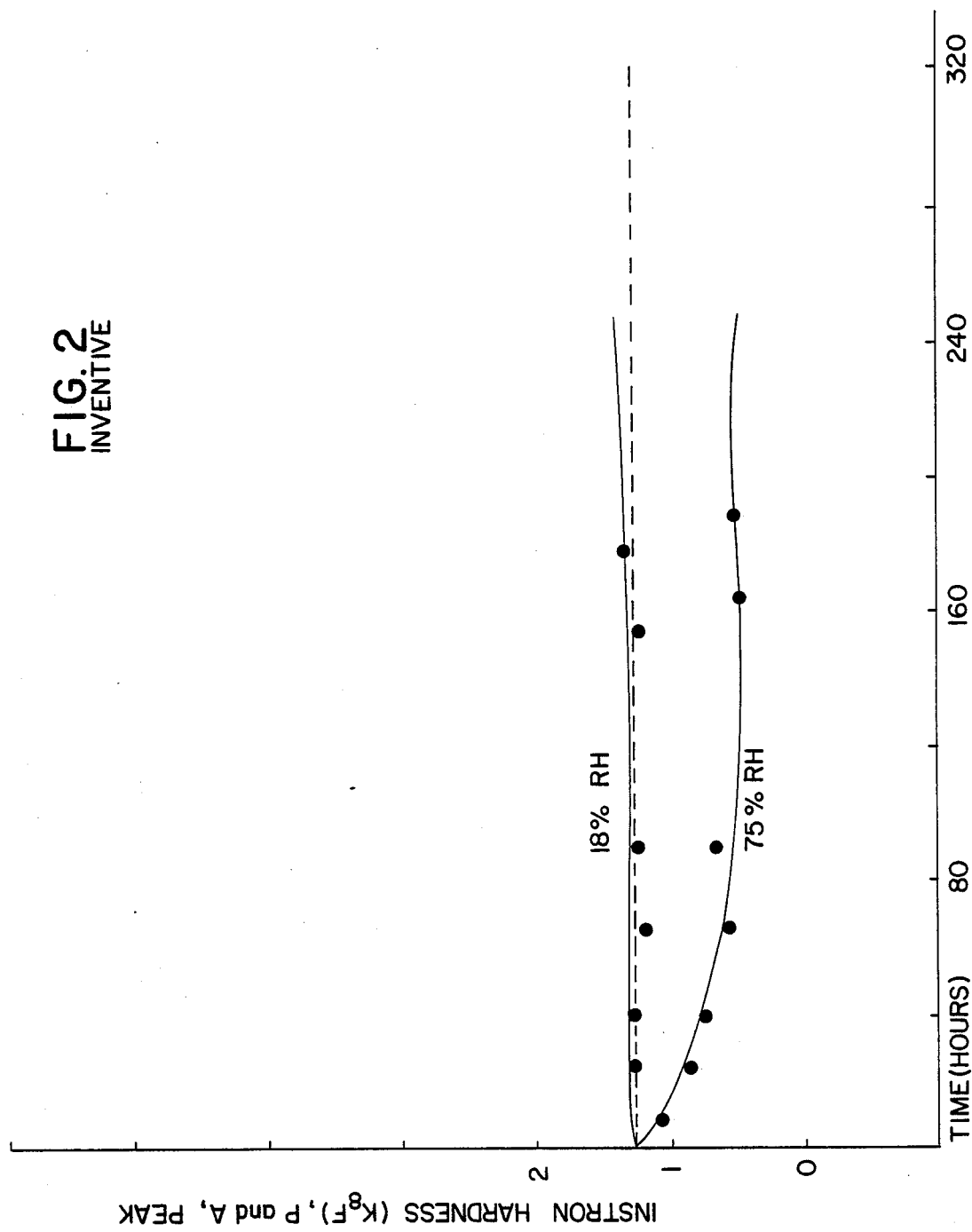

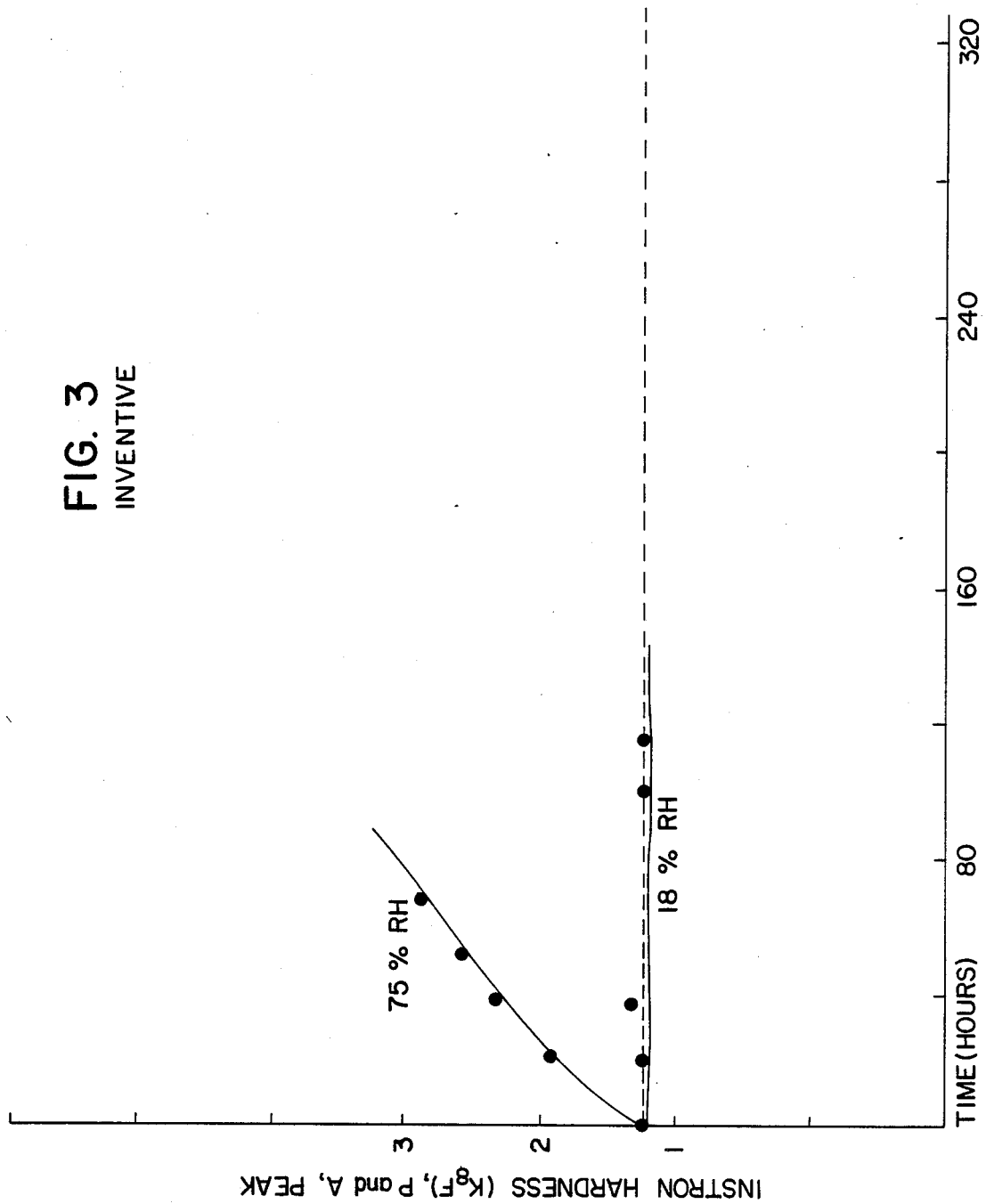

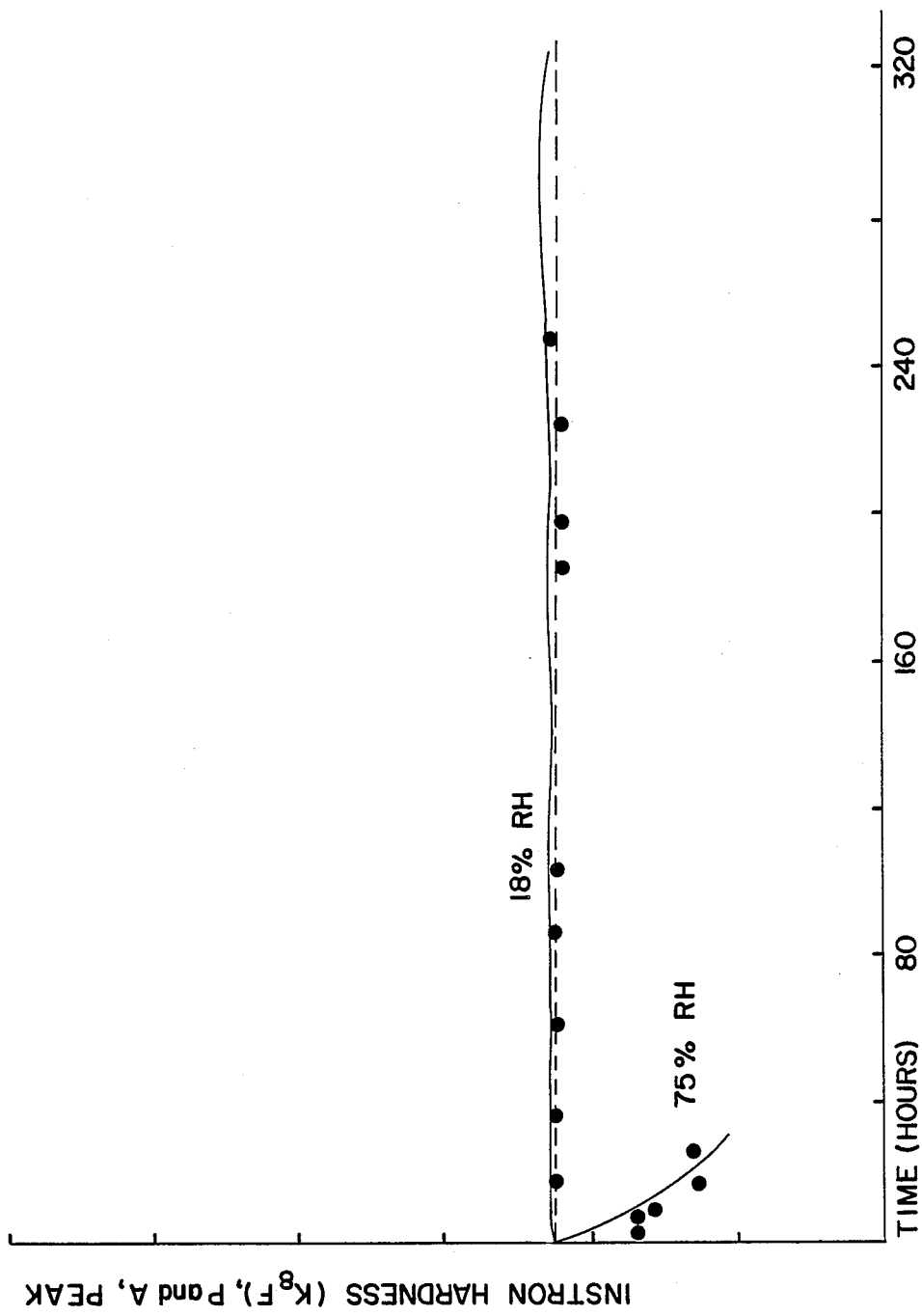

COMPARATIVE

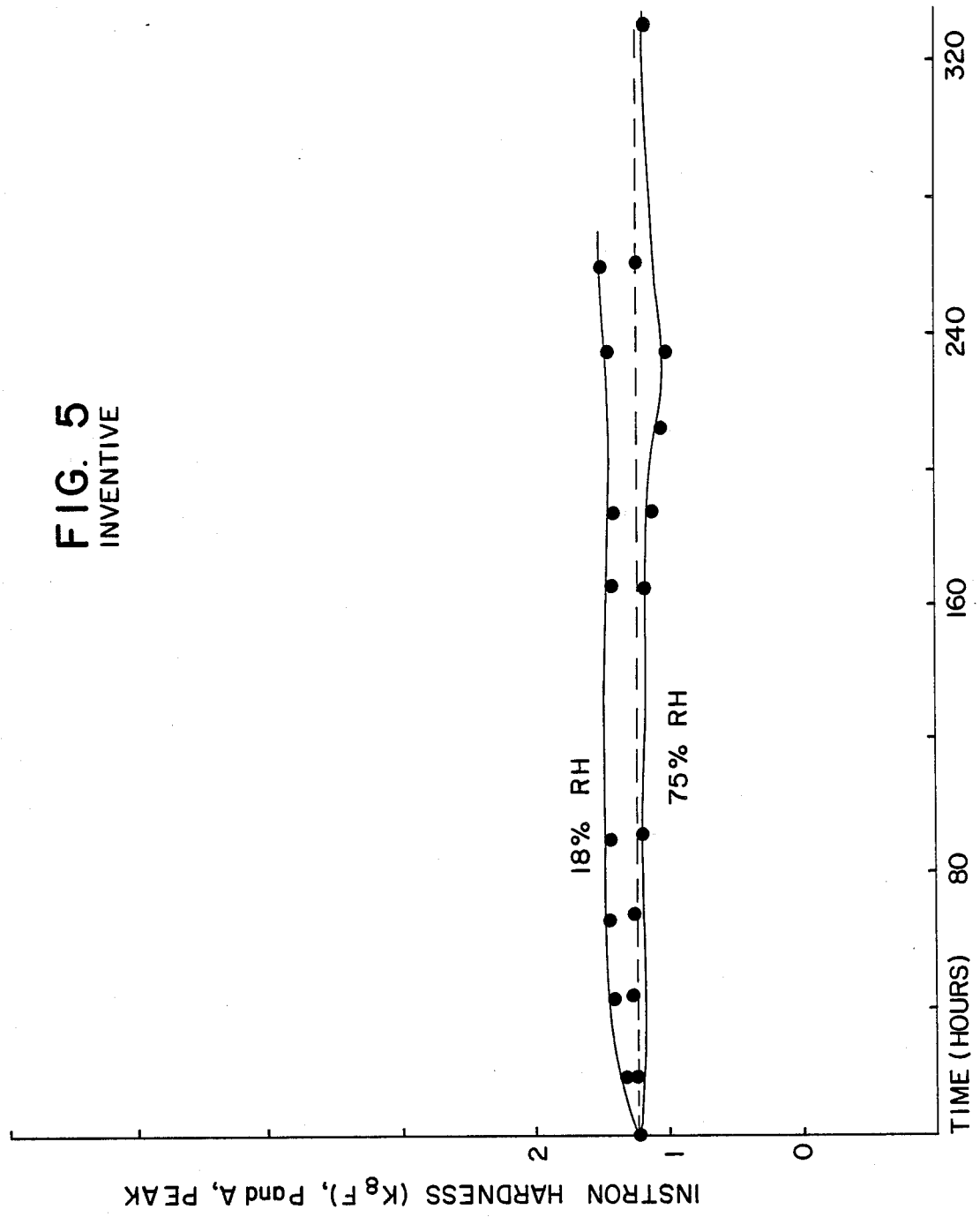

INVENTIVE

COMPARATIVE

ANHYDROUS, NON-STALING CHEWING GUM COMPOSITION

The present invention relates to a novel substantially anhydrous, non-staling chewing gum composition. More particularly this invention relates to a chewing gum composition containing a homogeneous premixture of a chewing gum base and a polyisobutylene in combination with a sweetening agent and a method for producing the same.

Chewing gum compositions generally comprise a substantially water insoluble, chewable gum base, such as chicle or substitutes therefor including jelutong, and natural or synthetic elastomeric resins. Also incorporated within the chewing gum composition, besides flavoring liquids and sweeteners are plasticizers or softeners which improve the consistency and texture of the gum.

Several deficiencies with conventional chewing gums using normal plasticizers or softeners have existed which deficiencies have heretofore only been partially eliminated.

One such deficiency is the long term stability of chewing gums containing glycerin or additional amounts of water, notably their lack of long term shelf stability resulting in a relatively storage unstable product. The prior art has shown that glycerin has been added to the chewing gum formulations as a humectant which also serves as a binder, or hydrophilic plasticizer to bind the large amounts of powder compounds added to the formulation, such as the sweetening and filler components. The use of water has also been employed to soften the formulations. While glycerin enabled the gum to be softened and its presence avoided evaporation of the water present in the gum formulations, the formulations generally required use of low humidity cold rooms to enable them to set up so that they could be scored and wrapped after several days of storage.

The formulations containing additional levels of water required special storage conditions to enable water to be evaporated from the formulations so that the product would be able to be processed properly.

For example, U.S. Pat. No. 4,035,572 involves a gum base formulation with less than 0.5% moisture. This low percentage of moisture is due to the purification process which removes water and solvent from the gum base.

U.S. Pat. No. 4,382,963 involves a low calorie chewing gum which uses polydextrose as the sole soluble bulking agent. The moisture content in the final product is about 1 to 5% and this is obtained by omitting the aqueous component, e.g., sorbitol syrups or corn syrups, which are normally used in chewing gum products.

U.S. Pat. No. 3,262,784 concerns a chewing gum composition which has less than 1% moisture in the final product due to heating between about 170° and 250° F. to drive off the water.

U.S. Pat. No. 4,150,161 concerns a two component confection having a carbonated candy component and a pliable bubble gum component with each component having a controlled water activity between 0.1 to 0.3 and which is capable of surviving long periods of storage when packaged in a moisture resistant material.

In contrast, U.S. Pat. No. 4,514,422 to Yang et al discloses the formation of a chewing gum composition which exhibits improved shelf life and resistance to staling. This patentee discloses that chewing gums and bubble gums have been prepared in the past, with the purpose in mind of extending shelf life. Characteristically, gums prepared and stored, even at room temperature for extended periods of time, tend to lose their moisture and elasticity, with the result that they become brittle, and initially crumble when they are placed in the mouth. This problem is particularly noticeable in the instance of sugarless gums, and particularly those gums that are stored in a dry atmosphere, i.e. an atmosphere having less than from 50 to 60% relative humidity.

Yang continues by stating that sugarless gums conventionally contain on the order of about 5% of water, and it was therefore theorized that brittleness or the phenomenon of staling results from the loss of that water, due to evaporation or otherwise, over time. Specifically, most sugarless gums contain large amounts of sorbitol, which serves conventionally as a sweetener, as well as a bulking aid. Sorbitol is known for its tendency to recrystallize in the presence of even small amounts of water, and its tendency to crystallize when the water in which it is dissolved is removed. It was therefore theorized by Yang et al that, as the water containing the sorbitol in the gum composition, is lost by evaporation or otherwise, the sorbitol crystallizes and thus promotes the embrittlement of the gum composition, which contributes to the staling phenomenon. Thus far, the only workable approach to prolonging gum composition freshness relied on the use of fin-seal packaging with water vapor impermeable laminates to exclude all external ambient atmosphere and accompanying moisture and conversely to prevent the egress of moisture from the package contents. This approach is noted as being very costly and has its limitations, as periodic package leakage permits staling to occur unabetted as before.

In accordance with the Yang et al disclosure, a gum composition having improved shelf life and resistance to staling is prepared which comprises a substantially anhydrous mixture of a gum base, at least one sugar alcohol, and glycerin, the glycerin present in an amount from about 8% to about 18% by weight of the gum composition. The gum composition is further characterized by containing no more than 2% by weight of water in any form. In addition to these ingredients, Yang et al also employed a variety of other materials, such as plasticizers, softeners and thickeners.

Referring to the drawings:

FIG. 1 represents the water exchange rate at 75% and 18% relative humidity for the first inventive formulation of Example 1.

FIG. 2 represents the hardness measurement from water exchange rates at 75% and 18% relative humidity for the second inventive formulation of Example 1.

FIG. 3 represents the moisture measurement from water exchange rates at 755 and 18% relative humidity for the second inventive formulation of Example 1.

FIGS. 4a and 4b represent the water exchange rate at 75% and 18% relative humidity for the comparative formulation of Example I, hardness and moisture measurements respectively.

Figure 6:
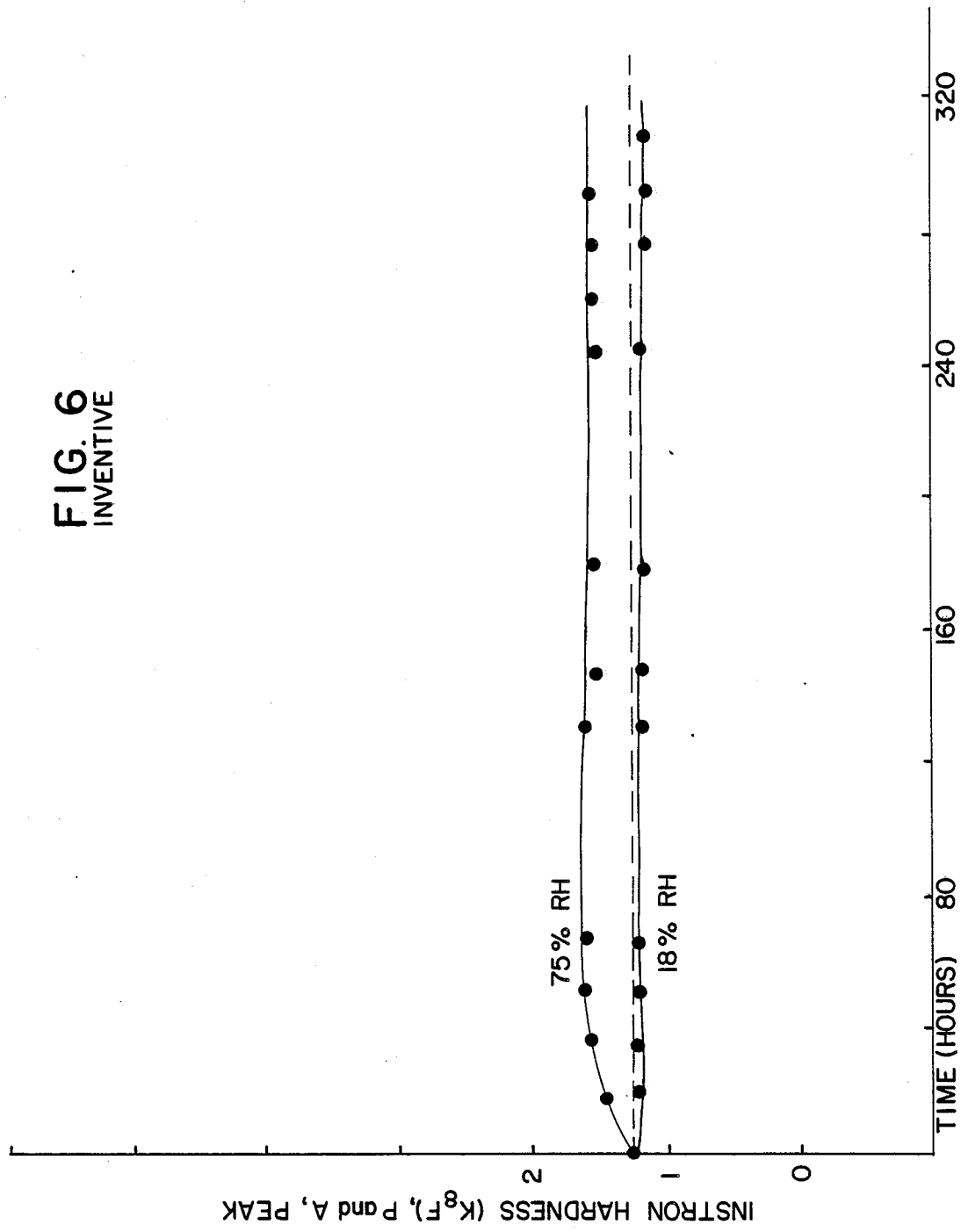

FIGS. 5 and 6 represent the water exchange rates at 75% and 18% relative humidity for inventive formulation 3 of Example II, hardness measurement, and moisture measurement respectively.

Figure 7:
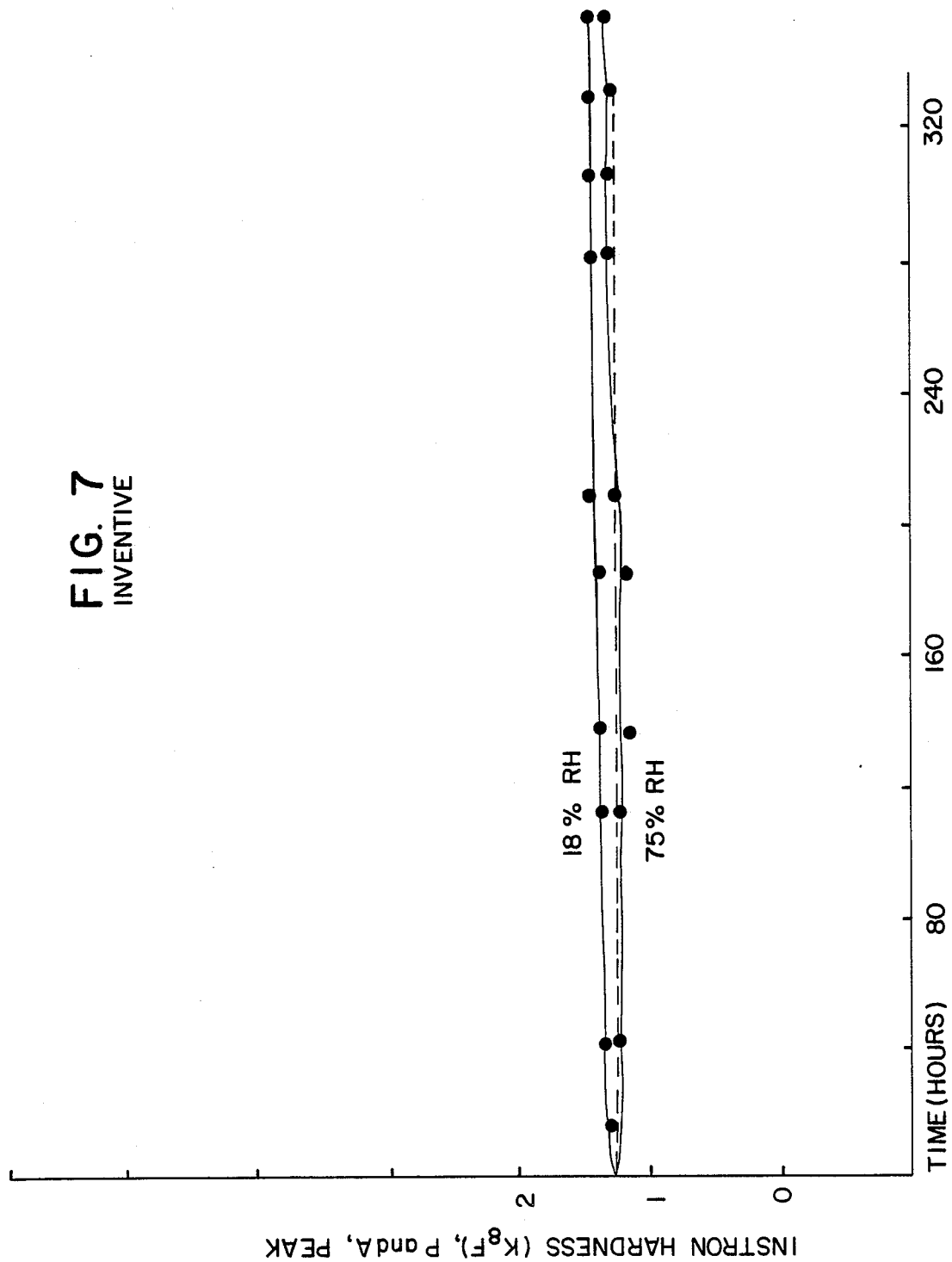
Figure 8:
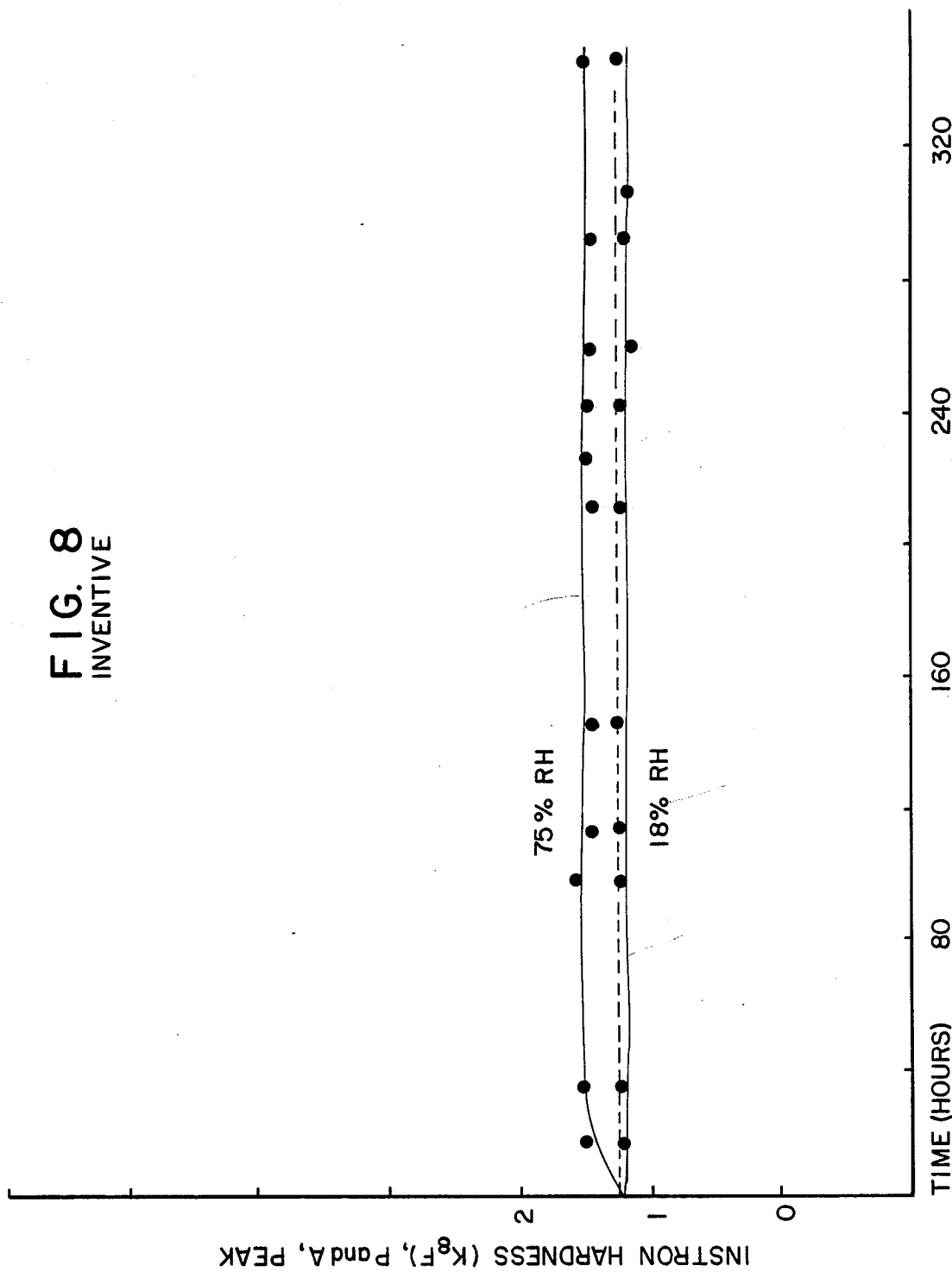

FIGS. 7 and 8 represent the water exchange rate at 755 and 18% relative humidity for inventive formulation 3 of Example II, hardness measurement and moisture measurement respectively.

Figure 9:
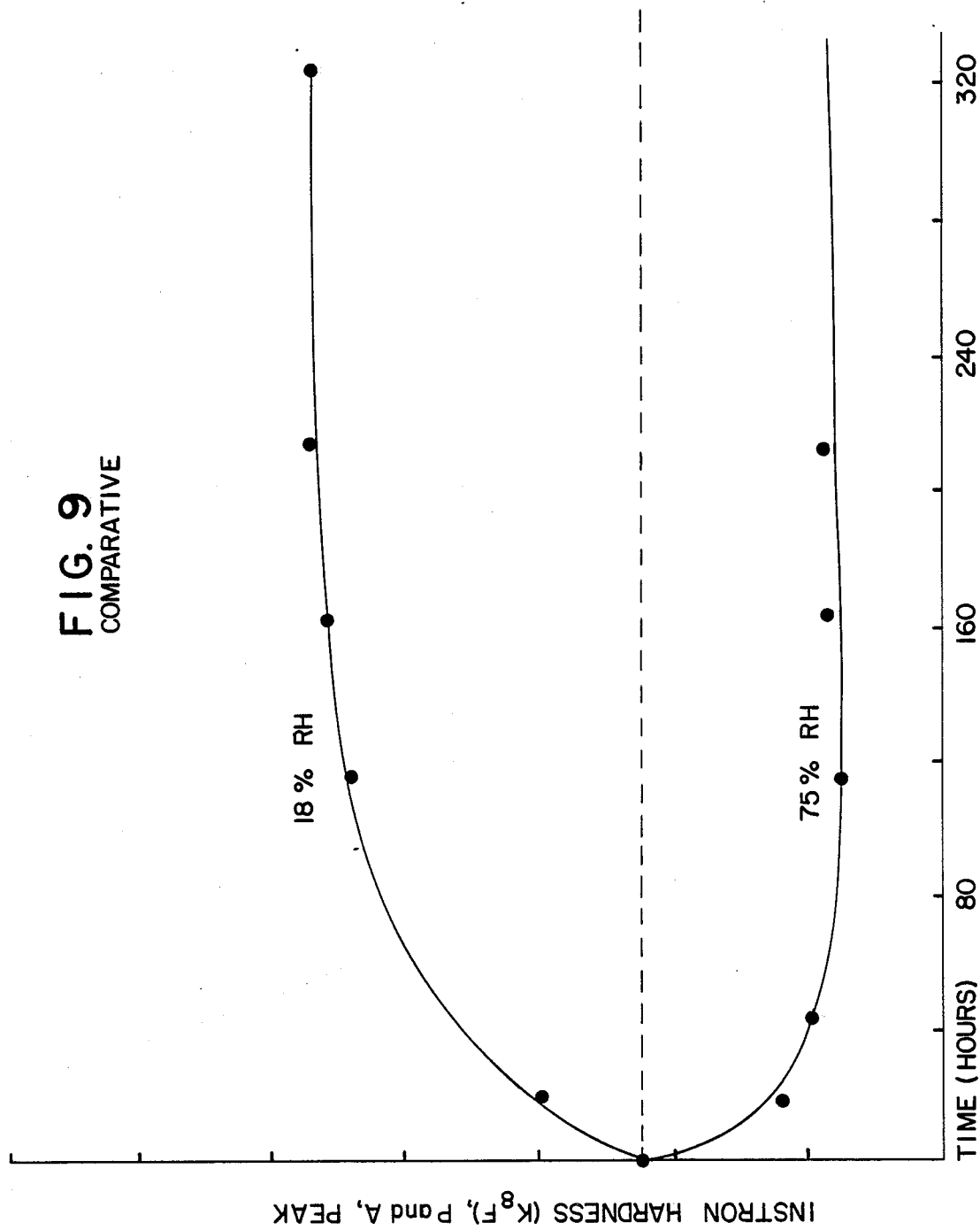

FIG. 9 represents the water exchange rate at 75% and 18% relative humidity for comparative formulation 3.

In accordance with the present invention a chewing gum composition is prepared which is a substantially anhydrous, non-staling composition, which comprises a homogeneous premixture of a chewing gum base and a polyisobutylene having an average molecular weight of about 20,000 to about 100,000 in combination with a sweetening agent. A preferred embodiment of the present invention comprises a homogeneous premixture containing about 10% to about 60% chewing gum base, about 2% to about 20% polyisobutylene having an average molecular weight of about 20,000 to about 100,000 and separately about 38% to about 70% sweetening agent, all percents being by weight of the final chewing gum composition.

The chewing gum compositions of the instant invention are substantially anhydrous, that is they contain a total water content below about 2% by weight of the final composition and preferably below about 1% by weight. Amounts of water above 2% have been found to be unsuitable to prepare a product which exhibits a stabilized water equilibrium, i.e., non-staling product under both high and low humidity conditions, namely 75% and 18% respectively.

The chewing gum compositions of this invention containing the inventive premixture exhibit a balanced effect by reducing the chewing gum sensitivity to moisture pickup while remaining non-staling without the need for special fin seal airtight packaging normally associated with chewing gums containing water and/or glycerin humectant. In addition, the formulations of this invention are able to be prepared without the essential presence of known hydrophilic plasticizers, such as glycerin, corn syrup, lycasin, sorbitol solutions, and so forth.

The inventive chewing gum formulations exhibit rapid processing resulting from a rapid setting base formulation and easy processing and handling resulting from the compositions soft and pliable chewing gum consistency. The chewing gum formulations of this invention may be packaged immediately after being prepared without the need for special conditioning as is normal for moisture containing formulations or for storage under low humidity conditions for most glycerin containing formulations. In addition, the resulting chewing gum compositions have a consistent firm chew that is a uniform chew character throughout the chewing period coupled with a higher level of flavor release and stabilization. The chewing gum also have relatively long storage stability without product deterioration. When the compositions are chewed, enhanced duration of flavor release is experienced.

The chewing gum compositions of the invention are prepared by forming a premixture of a chewing gum base and a polyisobutylene. The polyisobutylene must have an average molecular weight of about 20,000 to about 100,000 (Flory molecular weight). These materials are usually identified as low to medium molecular weight materials having preferred average molecular weights of about 40,000 to about 60,000. When used in the premixtures of this invention they are employed in amounts of about 2 to about 20% by weight of the total formulation and preferably from about 3 to about 15% by weight of the total formulation. Amounts below about 2% possess insufficient binding power to retain the dry, powdery components in the formulation, such as the dry, powdered sweetener. Amounts above about 20% create a large bolus which may be rubbery/tight upon chewing.

The polyisobutylene premix with the chewing gum base is the essential feature of this invention. The mere use of a polyisobutylene chewing gum base is insufficient to achieve the benefits of this invention. By using such a combination it is possible to obtain a non-staling product without the need for using hydrophilic plasticizers. As is taught in the prior art, hydrophilic plasticizers are needed to soften a normal gum base and enable retention of the powdery substances employed, such as the sweetening agent and optional filler. The present use of polyisobutylene in combination with a previously prepared chewing gum base, however, avoids the essential presence of such hydrophilic plasticizers while enabling a product to be prepared with acceptable firmness, thus functioning as a texturizing agent, and allowing incorporation of the other components of the formulation. The premixture also enables the use of increased levels of flavoring agent without causing a soft texture to result during chewing. The resulting chewing gum composition has been found to be essentially non-staling, that is it does not pick up or loose water to any significant degree and thus enables formation of a product that does not require special packaging or processing procedures.

Chewing gum formulations in which the novel premixture is used are not critical and contain the usual ingredients. The formulations may be either sugar containing or sugarless chewing gum compositions. In general, useful amounts of gum base may vary from about 10% to about 60% by weight of the final chewing gum composition, with preferred amounts being about 10% to about 40% by weight and most preferably about 15% to about 25% by weight. The gum base may be any water-insoluble gum base well known in the art. Illustrative examples of suitable polymers useful in gum base include both natural and synthetic elastomers and rubbers. For example, those polymers which are suitable in gum bases, include, without limitation, substances of vegetable original such as chicle, jelutong, gutta percha and crown gum. Synthetic elastomers such as butadiene-styrene copolymers, isobutylene-isoprene copolymers, polyethylene, polyisobutylene and polyvinylacetate and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythriton ester of partially hydrogenated wood rosin and partially hydrogenated wood rosin, pentaerythritol ester of wood rosin, glycerol ester of wood rosin, glycerol ester of partially dimerized rosin, glycerol ester of polymerized rosin, glycerol ester of tall oil rosin, glycerol ester of wood rosin and partially hydrogenated wood rosin and the partially hydrogenated methyl ester of rosin, such as polymers of alpha-pinene or beta-pinene, terpene resins including polyterpene and mixtures thereof. The solvent may be employed in an amount ranging from about 10% to about 75% and preferably about 45% to about 70% by weight to the gum base.

A variety of traditional ingredients such as plasticizers or softeners such as lanolin, stearic acid, sodium stearate, potassium stearate, glyceryl triacetate, glycerine and the like may be employed in the gum base. Useful waxes, for example, natural waxes, petroleum waxes such as polyurethene waxes, paraffin waxes and microcrystalline waxes may also be incorporated into the gum base to obtain a variety of desirable textures and consistency properties. These individual additional materials are generally employed in amounts of up to about 30% by weight and preferably in amounts of from about 3% to about 20% by weight of the final gum base composition.

The process for preparing the base is not critical and constitutes procedures well known to the ordinary skilled artisan. The premixture of the invention is prepared by softening the performed chewing gum base, normally by heating to its softening/melting point and blending into the base the polyisobutylene polymer. Mixing may be conveniently performed until a homogeneous mixture is obtained. In this manner a blended elastomeric formulation is prepared containing polyisobutylene elastomer essentially intermixed or entrapped within the chewing gum matrix. Mixing may be continued for times of about 10 minutes to about 50 minutes, with times of about 15 to 25 minutes being preferred.

Once the homogeneous premixture is obtained the final chewing gum composition may be prepared, such as by addition of the sweetener to the premixture under agitation until a final formulation is prepared. The homogeneous premixture may be either added to the sweetener or the reverse may be conducted.

The sweetening agent may be selected from a wide range of materials including water-soluble agents, water-soluble artificial sweeteners, and dipeptide based sweeteners, including mixtures thereof. Without being limited to particular sweeteners, representative illustrations encompass:

A. Water-soluble sweetening agents such as monosaccharides disaccharides and polysaccharides such as xylose, ribose, mannose, galactose, fructose, dextrose, sucrose, maltose, starch, and sugar alcohols such as sorbitol, xylitol, mannitol, maltitol, and mixtures thereof. It should be noted that glucose, corn syrup solids and partially hydrogenated starch hydrolysates may be optionally employed even though they also possess hydrophilic plasticizer activity.

B. Water-soluble artificial sweeteners such as the soluble saccharin salts, i.e., sodium or calcium saccharin salts, cyclamate salts, acesulfam-K, sucralose and the like, and the free acid form of saccharin.

C. Dipeptide based sweeteners such as L-aspartyl-L-phenylalanine methyl ester and materials described in U.S. Pat. No. 3,492,131, L-D-aspartyl-N-(2,2,4,4-tetramethyl-3-thietazyl)-D-alaninamide hydrate, and the like as well as other protein sweeteners such as talin.

In general, the amount of sweetener will vary with the desired amount of sweetener selected for a particular chewing gum. This amount will normally be about 0.001% to about 90% by weight of the final chewing gum composition when using an easily extractable sweetener. The water-soluble sweeteners described in category A above, are preferably used in amounts of about 30% to about 70% by weight, and most preferably amounts needed to prepare a final chewing gum composition containing 100% by weight of all components. In contrast, the artificial sweeteners described in categories B and C are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils and are used in combination with some of the bulk sweeteners of category A.

Useful optional colorants include the pigments such as titanium dioxide, which may be incorporated in amounts of up to about 10% by weight, and preferably up to about 6% by weight. Colorants may also include dyes suitable for food, drug and cosmetic applications. These colorants are known as F.D.&C. dyes. The materials acceptable for the foregoing spectrum of use are preferably water-soluble. Illustrative examples include indigo dye, known as F.D.&C. Blue No. 2, which is the disodium salt of 5,5'-indiogotindi-sulfonic acid. Similarly, the dye known as F.D.&C. Green No. 1, comprises a triphenylmethane dye and is the monosodium salt of the 4-[4-Methyl-p-sulfobenzylamino) diphenyl-methylene]-[1-(N-ethyl-N-P-sulfobenzyl)-2, 5-cyclohexadienimini]. A full recitation of F.D.&C. and D.&C. colorants and their corresponding chemical structures may be found in the Kirk-Othmer Encyclopedia of Chemical Technology, in Volume 5, at pages 857–884.

The chewing gum composition may also include the conventional additives such as softeners and plasticizers as discussed above as well as flavoring agents; emulsifiers such as lecithin and glyceryl monostearate; and additional fillers such as aluminum hydroxide, alumina, aluminum silicates, calcium carbonate, and talc. Combinations of these conventional additives are contemplated. These fillers may also be used in the gum base in various amounts. Preferably the amount of filters when used will vary from about 4% to about 50% by weight of the final chewing gum composition.

In addition, the formulation may contain detackifiers such as non-toxic vinyl polymers including polyvinyl acetate and its partial hydrolysates, polyvinyl alcohol and mixtures thereof. Preferably the vinyl polymer possess a molecular weight ranging from about 3,000 to about 94,000. When using such agents it is beneficial to also employ emulsifiers which are compatible with such non-toxic polymers including lecithin, glyceryl monostearate, fatty acid monoglycerides, diglycerides and triglycerides, glyceryl triacetate, propylene glycol monostearate and mixtures thereof.

All of the techniques associated with the preparation of the chewing gum products in the forms taught are well known and the present method may vary somewhat depending upon the specific end product to be manufactured without departing from the essential parameters of the invention. Such other details are presented for purposes of illustration, and provide a best mode for the practice of the invention, and therefore the invention should not be limited to those parameters.

A preferred process of preparing a chewing gum composition involves: (a) admixing a chewing gum base at a temperature from about 60° C. to about 110° C. with the polyisobutylene to obtain a homogeneous pliable mixture (about 10 to 50 minutes); (b) once the mixture is homogeneous, incrementally add to the homogeneous mixture the sweetening agent until a homogeneous mass is prepared (usually 1 to 10 minutes); (c) this mass may then be removed and stored or processed into final product. When additional components are added, mixing is continued and then the remaining chewing gum ingredients are added and mixed until a uniform mass is obtained (about 1 to 10 minutes); and (d) thereafter the mixture is formed into suitable chewing gum shapes.

The chewing gums of the invention may be in any form known in the art, such as stick gum, slab gum, chunk gum, shredded gum, hard coated gum, tabletted gum, as well as center-filled gum.

The following examples serve to provide further appreciation of the invention but are not meant in any way to restrict the effective scope of the invention. All percentages throughout the specification are by weight % of the final chewing gum composition unless otherwise indicated.

EXAMPLE 1

This Example demonstrates the preparation of sugarless chewing gum compositions containing the novel anhydrous gum base premixture of this invention compared with conventionally prepared sugarless chewing gum compositions.

Chewing gum pieces were prepared using the formulations set forth in Table I by mixing a molten gum base with the polyisobutylene until a homogeneous mixture is obtained. To this mixture is added the emulsifier, softener and a portion of the sweeteners while mixing, and then the remaining ingredients were blended into the formulation until a homogeneous mixture is obtained. These formulations were then prepared into chewing gum pieces.

Figure 4B:
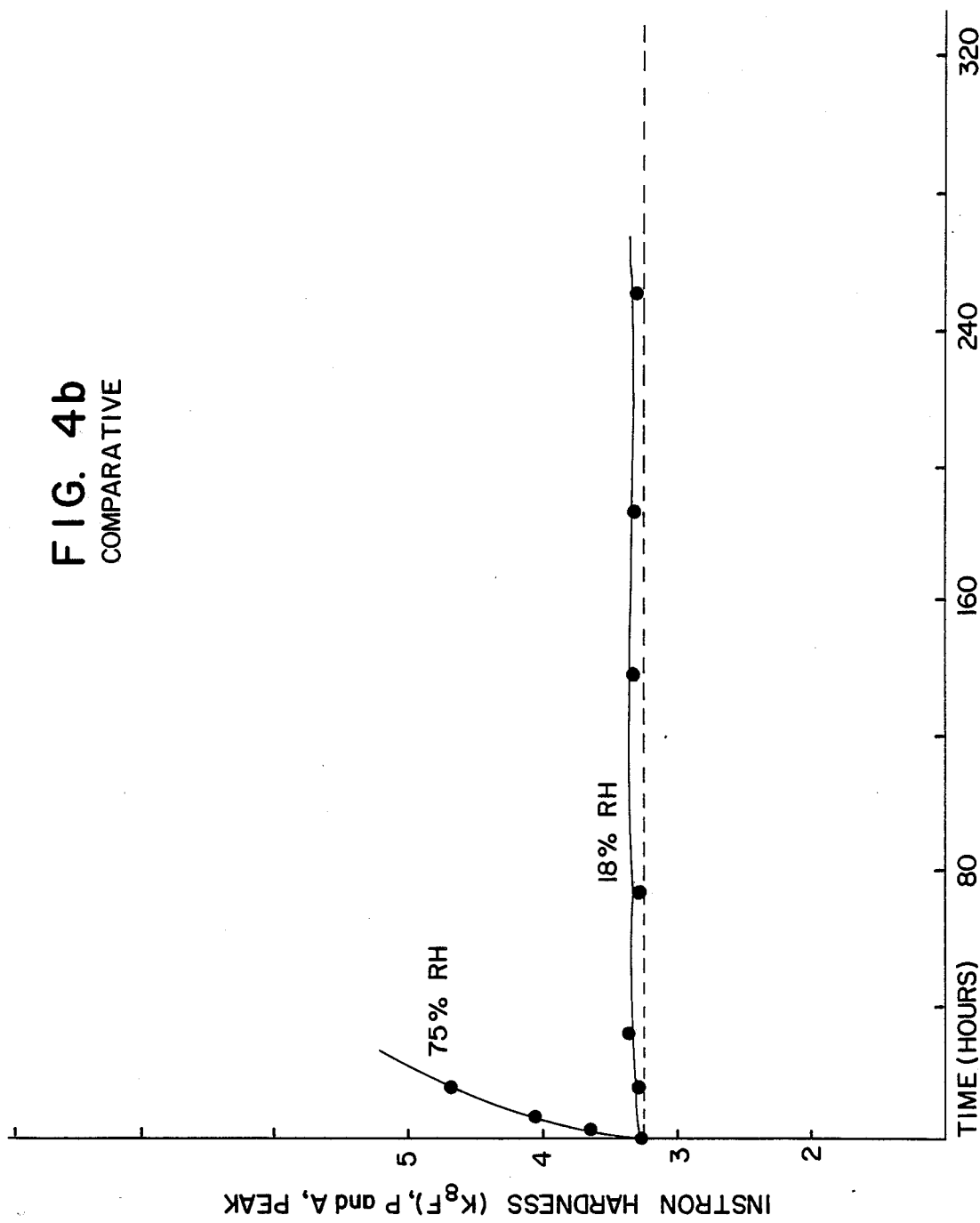

The chewing gum pieces were subjected to a stability test at two different conditions: (a) 18% relative humidity at 18° C. for 320 hours and (b) 75% relative humidity at 25° C. for 320 hours. An Instron instrument with a 5/16 inch probe at a speed of 12 millimeters per minute and a load range of 10 kilogram force was used to determine the chewing gum piece hardness. Hardness values are used to indicate the relative degree of flexibility due to maintenance of water exchange to and from the gum piece and the environment. Variations in hardness values indicate changes in flexibility and softness, which directly relates to water loss or gain in the gum piece. Lower rates of water exchange are reflected by lower rates of change in hardness, which are indicative of a more stable chewing gum in terms of retention of texture, softness, freshness and other properties characteristic of prolonged shelf-life. The results are set forth in FIGS. 1 to 4 and demonstrate the rate of water exchange under both conditions. The inventive formulation in FIGS. 1 to 3 showed significant reductions in rates of water exchange under both conditions as evidenced by reduced rates of hardness change. At low humidity conditions, virtually no moisture loss was evidenced whereas at high humidity conditions moisture pickup was significantly lower than the comparative formulation shown in FIGS. 4a (hardness measurement) and 4b (moisture measurement).

FIGS. 1, and 2 show the hardness levels achieved by Inventive Examples 1 and 2 within 240 hours at 18 and 75% relative humidity. FIG. 3 shows the moisture content for Inventive formulation 2 at 18 and 75% relative humidities. It is apparent from the graphs that the inventive formulations exhibited virtually no tendency to pickup or lose water under both conditions, whereas the prior art, FIGS. 4a and 4b, control gum clearly exhibited a strong tendency to absorb mixture from the surrounding environment.

TABLE I

| | Inventive (amounts in % by weight) | | Comparative (amounts in % by weight |
|---|---|---|---|
| | 1 | 2 | A |
| Gum base | 22.5 | 22.0 | 23.0 |
| Base water content | (3% water) | (<1% water) | — |
| Filler (Calcium carbonate) | — | — | 2.9 |
| Lecithin emulsifier | 0.50 | 0.50 | 0.5 |
| Polyisobutylene (molecular weight 42,000–47,000) | 8.0 | 8.0 | — |
| Glycerin | — | — | 13.0 |
| Sorbitol, powder | 51.6 | 51.5 | 46.6 |
| Mannitol | 15.0 | 15.0 | 12.0 |
| Flavor (spearmint) | 2.00 | 1.80 | 1.50 |
| Color | 0.10 | 0.10 | 0.10 |
| Artificial sweetener | 0.30 | 0.33 | 0.40 |
| Acetylated monoglyceride | — | 0.50 | — |
| Spray dried flavor | — | 0.27 | — |

EXAMPLE 2

This example demonstrates the preparation of sugar containing chewing gum compositions containing the novel anhydrous gum base premixture of this invention compared with conventionally prepared chewing gum compositions. The formulations were prepared as in Example 1 and are set forth in Table II.

The chewing gum pieces were subjected to stability tests at the two conditions set forth in Example 1 according to the procedure of Example 1. The results are set forth in FIGS. 5 through 9 diagram the rate of water exchange under both high and low humidity conditions.

FIGS. 5 and 6 represent the water exchange rates at 75% and 18% relative humidity for inventive formulation 3 wherein FIG. 5 is the hardness measurement and FIG. 6 is the moisture measurement. FIGS. 7 and 8 represent the water exchange rates at 75% and 18% relative humidity for inventive formulation 4 wherein FIG. 7 is the hardness measurement and FIG. 8 is the moisture measurement.

FIG. 9 represents the water exchange rate at 755 and 18% relative humidity for comparative formulation B, hardness measurements.

The inventive gum formulations containing the gum base premixture was observed to show a significant reduction in staling under low humidity conditions and a significant reduction in moisture pickup at high humidity conditions. In contrast, the comparative formulation as depicted in FIG. 9 showed a tremendous increase in hardness at low humidity conditions and increased softness at high humidity conditions.

TABLE II

| | Inventive (amounts in % by weight) | | Comparative (amounts in % by weight |
|---|---|---|---|
| | 3 | 4 | B |
| Gum base | 18 | 16 | 17.2 |
| Polyisobutylene (molecular weight 40,000 to 47,000) | 5 | 6 | — |
| Pulverized sugar | 74 | 74.8 | 64.7 |
| Flavor | 2.2 | 2.2 | 1.6 |
| Sweetener | 0.8 | 1.0 | — |
| CaCO$_3$ | — | — | 3.0 |
| Glucose syrup | — | — | 13.5 |

EXAMPLE 3

This Example demonstrates the preparation of two separate flavored sugar containing chewing gum formulations using the novel gum base premixture with de-tackifing agents. The formulations were prepared as in Example 1 and are set forth in Table III except that the premixture was prepared by blending the polyisobutylene, polyvinyl acetate, acetylated monoglyceride together with the chewing gum base composition prior to addition of the remaining components. The formulations exhibited a long lasting flavor release, were non-staling during storage and had non-stick to denture properties during chewing.

TABLE III

|  | I | II |
|---|---|---|
| Gum base | 25.4 | 25.4 |
| Polyisobutylene (molecular weight 42,000–47,000) | 4.2 | 4.2 |
| Polyvinylacetate | 1.5 | 1.5 |
| Acetylated monoglyceride | 0.15 | 0.15 |
| Sugar, powdered | 63.5 | 64.25 |
| Flavor, spearmint | 3.3 | — |
| Flavor, peppermint | — | 2.55 |
| Artificial sweeteners | 1.45 | 1.45 |
| Oil | 0.2 | 0.2 |
| Emulsifiers | 0.3 | 0.3 |

The invention being thus described, it will be obvious that the same may be varied in many ways. Such variations are not to be regarded as a departure from the spirit and scope of the invention and all such modifications are intended to be included within the scope of the following claims.

What is claimed is:

1. A substantially anhydrous, non-staling chewing gum composition, which comprises: a two component composition, the first being a homogenous premixture of about 10 to about 60% of a chewing gum base and about 2 to about 20% of a polyisobutylene having an average molecular weight of about 20,000 to about 100,000, a second component being about 38% to about 70% of a sweetening agent.

2. The chewing gum composition of claim 1, wherein the composition contains about 10 to about 40% chewing gum base, about 3 to about 15% polyisobutylene and remainder of a sweetening agent.

3. The chewing gum composition of claim 1, wherein the chewing gum composition is a sugar or sugarless containing chewing gum composition.

4. The chewing gum composition of claim 1, wherein the gum base comprises an elastomer selected from the group consisting of natural rubber, synthetic rubber and mixtures thereof.

5. The chewing gum composition of claim 4, wherein the gum base elastomer is selected from the group consisting of chicle, jelutong, balata, gutta-percha, lechi-capsi, sorva, butadiene-styrene copolymers, polyisobutylene, isobutylene-isoprene copolymers, polyethylene, polyvinylacetate, and mixtures thereof.

6. The chewing gum composition of claim 1, wherein there is additionally included fillers, coloring agents, flavoring agents, softeners, plasticizers, and mixtures thereof.

7. The chewing gum composition of claim 6, wherein the flavoring agent is selected from the group consisting of spearmint oil, cinnamon oil, oil of wintergreen (methylsalicylate), peppermint oil, lemon oil, orange oil, grape oil, lime oil, grapefruit oil, apple essence, strawberry essence, cherry essence, pineapple essence, banana oil and mixtures thereof.

8. The chewing gum composition of claim 1, wherein the sweetening agent is selected from the group consisting of water-soluble sweetening agents, water-soluble artificial sweeteners, dipeptide based sweeteners and mixtures thereof.

9. The chewing gum compositions of claim 8, wherein the sweetening agent is selected from the group consisting of saccharin acid, saccharin salts, cyclamate salts, acesulfame-K, L-aspartyl-L-phenylalanine methyl ester, xylose, ribose, glucose, mannose, galactose, fructose, dextrose, sucrose, sugar, maltose, partially hydrolyzed starch or corn syrup solids, sorbitol, xylitol, mannitol; talin, dihydrochalcone,; glycyrrhizin; stevia rebaudiana (stevioside); sucralose and mixtures thereof.

10. A process for preparing a substantially anhydrous, non-staling chewing gum composition, which comprises: preparing a premixture of about 10 to about 60% of a chewing gum base and about 2 to about 20% of a polyisobutylene having an average molecular weight of about 20,000 to about 100,000 by softening the gum base under heat and blending into the gum base the polyisobutylene until a homogenous mixture is obtained; adding about 38% to about 70% of a sweetening agent to the homogenous mixture and mixing until a uniform chewing gum composition is obtained and recovering the chewing gum composition.

11. The process of claim 10 wherein the chewing gum composition is further cut into chewing gum pieces and wrapped without conditioning, and then recovering the chewing gum composition.

* * * * *